US011893955B2

(12) United States Patent
Wang et al.

(10) Patent No.: US 11,893,955 B2
(45) Date of Patent: Feb. 6, 2024

(54) DISPLAY PANEL COMMON VOLTAGE COMPENSATION METHOD FOR COMMON VOLTAGE DETECTED WITHIN PREDETERMINED RANGE OF COMMON ELECTRODE, AND DISPLAY PANEL FOR THE SAME

(71) Applicants: Beijing BOE Display Technology Co., Ltd., Beijing (CN); BOE TECHNOLOGY GROUP CO., LTD., Beijing (CN)

(72) Inventors: Tingting Wang, Beijing (CN); Qi Wang, Beijing (CN); Yan Yan, Beijing (CN); Xue Wang, Beijing (CN)

(73) Assignees: Beijing BOE Display Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/435,209

(22) PCT Filed: Feb. 7, 2021

(86) PCT No.: PCT/CN2021/075778
§ 371 (c)(1),
(2) Date: Aug. 31, 2021

(87) PCT Pub. No.: WO2021/160064
PCT Pub. Date: Aug. 19, 2021

(65) Prior Publication Data

US 2022/0139350 A1 May 5, 2022

(30) Foreign Application Priority Data

Feb. 14, 2020 (CN) ........................ 202010093311.2

(51) Int. Cl.
*G09G 3/36* (2006.01)

(52) U.S. Cl.
CPC .................................. *G09G 3/3696* (2013.01)

(58) Field of Classification Search
CPC ...... G09G 3/36; G09G 3/3611; G09G 3/3614; G09G 3/3622; G09G 3/3625; G09G 3/364;
(Continued)

(56) References Cited

U.S. PATENT DOCUMENTS 9,483,991 B2 11/2016 Min et al.
2006/0244704 A1* 11/2006 JaeHun ................ G09G 3/3655 345/92
(Continued)

FOREIGN PATENT DOCUMENTS

CN 101320550 A 12/2008
CN 102842295 A 12/2012
(Continued)

OTHER PUBLICATIONS

China Patent Office, First Office Action dated May 7, 2021 for application No. CN202010093311.2.
(Continued)

*Primary Examiner* — Ke Xiao
*Assistant Examiner* — Nelson Lam
(74) *Attorney, Agent, or Firm* — HOUTTEMAN LAW LLC

(57) ABSTRACT

The present disclosure provides common voltage compensation method and device for display panel, a display panel, and a display device. The display panel includes a common electrode, a common voltage compensation unit, and common electrode lines. The common electrode lines are sequentially numbered according to a distance from the common voltage compensation unit, a number of the common electrode lines is n, and n is an integer greater than 8. The method includes: the common voltage compensation
(Continued)

unit providing common voltage to the common electrode; the common voltage compensation unit detecting actual common voltage on one of N1-th common electrode line to N2-th common electrode line, N1 being a value rounded down from n/8, and N2 being a value rounded down from n/4; the common voltage compensation unit compensating the common voltage of the common electrode according to the detected actual common voltage.

12 Claims, 4 Drawing Sheets

(58) Field of Classification Search
CPC .. G09G 3/3644; G09G 3/3648; G09G 3/3655; G09G 3/3666; G09G 3/3674; G09G 3/3677; G09G 3/3681; G09G 3/3685; G09G 3/3692; G09G 3/3696
USPC ..................................................... 345/87–104
See application file for complete search history.

(56) References Cited

U.S. PATENT DOCUMENTS

2007/0002005 A1* 1/2007 Kim ..................... G09G 3/3666 345/103
2009/0002303 A1* 1/2009 Huang ................. G09G 3/3696 345/89
2009/0146977 A1* 6/2009 Chan .................... G09G 3/3655 345/204
2010/0053056 A1* 3/2010 Lee ....................... G02F 1/1345 345/94
2011/0102401 A1* 5/2011 Feng .................... G09G 3/3655 345/98
2011/0181501 A1* 7/2011 Wei ...................... G09G 3/3655 345/87
2013/0328855 A1* 12/2013 Li ........................ G09G 3/3655 345/212
2014/0028535 A1* 1/2014 Min ..................... G09G 3/3655 345/87
2015/0054809 A1 2/2015 Lim et al.
2016/0117988 A1* 4/2016 Lee ...................... G09G 3/3233 345/82
2016/0180781 A1* 6/2016 Kim ..................... G09G 3/3655 345/212
2016/0188057 A1* 6/2016 Liu ...................... G09G 3/3655 345/173
2016/0189662 A1* 6/2016 Cho ..................... G09G 3/3648 345/87
2017/0011704 A1* 1/2017 Sung .................... G09G 3/3655

FOREIGN PATENT DOCUMENTS

CN 106652968 A 5/2017
CN 106782397 A 5/2017
CN 106898326 A 6/2017
CN 107678216 A 2/2018
CN 108873423 A 11/2018
CN 108873524 A 11/2018
CN 109637481 A 4/2019
CN 109767737 A 5/2019
CN 111243538 A 6/2020
KR 20170028510 A 3/2017

OTHER PUBLICATIONS

China Patent Office, Second Office Action dated Dec. 14, 2021 for application No. CN202010093311.2.

* cited by examiner

DISPLAY PANEL COMMON VOLTAGE COMPENSATION METHOD FOR COMMON VOLTAGE DETECTED WITHIN PREDETERMINED RANGE OF COMMON ELECTRODE, AND DISPLAY PANEL FOR THE SAME

CROSS-REFERENCE TO RELATED APPLICATION

This is a National Phase Application filed under 35 U.S.C. 371 as a national stage of PCT/CN2021/075778, filed on Feb. 7, 2021, an application claiming priority to Chinese patent application No. 202010093311.2 filed on Feb. 14, 2020, the disclosure of which is incorporated herein by reference.

TECHNICAL FIELD

The present disclosure relates to the field of display technologies, in particular to a common voltage compensation method and device for a display panel, a display panel, and a display device.

BACKGROUND

At present, Liquid Crystal Displays (LCDs) are more and more widely used, and the LCDs drive liquid crystal molecules to rotate by using a voltage difference between a common electrode and a pixel electrode, so as to display images. In the LCD, since coupling capacitors are formed by the common electrode and wirings in the LCD, for example, a coupling capacitor is formed by the common electrode and the data line, and a coupling capacitor is formed by the common electrode and the gate line, when a signal on the gate line or the data line abruptly changes, for example, when a signal on the gate line or the data line drops from a high level to a low level, a voltage across the coupling capacitor abruptly changes. The abrupt change in the voltage across the coupling capacitor causes a common voltage on the common electrode to fluctuate (i.e., the common voltage is difficult to remain stable), and thus the voltage difference between the common electrode and the pixel electrode becomes abnormal. As a result, the LCD has afterimages, crosstalk, and the like, which affect display effect. Therefore, the common voltage needs to be compensated.

SUMMARY

Embodiments of the present disclosure provide a common voltage compensation method for a display panel, the display panel including a common electrode, a common voltage compensation unit, and a plurality of common electrode lines coupled to the common electrode, the common electrode including a plurality of sub-electrodes arranged in rows and columns, the display panel including a first side and a second side opposite to each other in a column direction, the common voltage compensation unit being at the first side of the display panel, and the plurality of common electrode lines being arranged in the column direction and each extending in a row direction, wherein the plurality of common electrode lines are sequentially numbered according to a distance from the common voltage compensation unit, a number of the plurality of common electrode lines is n, and n is an integer greater than 8, and the method includes:

the common voltage compensation unit providing a common voltage to the common electrode through the plurality of common electrode lines;

the common voltage compensation unit detecting an actual common voltage on one of an N1-th common electrode line to an N2-th common electrode line, where N1 is a value rounded down from n/8, and N2 is a value rounded down from n/4; and the common voltage compensation unit providing, according to the detected actual common voltage, a compensation voltage to the common electrode through at least one of the plurality of common electrode lines to compensate the common voltage of the common electrode.

In some embodiments, detecting an actual common voltage on one of an N1-th common electrode line to an N2-th common electrode line, includes: detecting an actual common voltage on one of an N3-th common electrode line to the N2-th common electrode line, where N3 is a value rounded down from n/6.

In some embodiments, detecting an actual common voltage on one of an N1-th common electrode line to an N2-th common electrode line, includes:

detecting an actual common voltage on an N3-th common electrode line, where N3 is a value rounded down from n/6.

In some embodiments, the display panel further includes a voltage feedback line, one end of the voltage feedback line is coupled to the common voltage compensation unit, and the other end of the voltage feedback line is coupled to the common electrode line on which the actual common voltage is to be detected, and the common voltage compensation unit detecting an actual common voltage on one of an N1-th common electrode line to an N2-th common electrode line includes: the voltage feedback line acquiring the actual common voltage on the common electrode line coupled to the voltage feedback line and transmitting the acquired actual common voltage to the common voltage compensation unit.

In some embodiments, the common voltage compensation unit providing, according to the detected actual common voltage, a compensation voltage to the common electrode through at least one of the plurality of common electrode lines to compensate the common voltage of the common electrode, includes:

the common voltage compensation unit obtaining the compensation voltage according to the detected actual common voltage and transmitting the compensation voltage to at least one of a first compensated common electrode line, a second compensated common electrode line, and a third compensated common electrode line, and the at least one of the first compensated common electrode line, the second compensated common electrode line, and the third compensated common electrode line transmitting the compensation voltage to the common electrode, the first compensated common electrode line is a common electrode line from a first common electrode line to an N3-th common electrode line, where N3 is a value rounded down from n/6, the second compensated common electrode line is a common electrode line from an N4-th common electrode line to a common electrode line closest to the common voltage compensation unit, where N4 is a value rounded down from 3*n/4, and the third compensated common electrode line is an N5-th common electrode line, where N5 is a value rounded down from n/2.

In some embodiments, the display panel further includes a first voltage compensation line, a second voltage compensation line, and a third voltage compensation line, one end of the first voltage compensation line is coupled to the first compensated common electrode line, and the other end of the first voltage compensation line is coupled to the common voltage compensation unit, one end of the second voltage compensation line is coupled to the third compensated common electrode line, and the other end of the second voltage compensation line is coupled to the common voltage compensation unit, one end of the third voltage compensation line is coupled to the second compensated common electrode line, and the other end of the third voltage compensation line is coupled to the common voltage compensation unit, and the common voltage compensation unit transmitting the compensation voltage to at least one of a first compensated common electrode line, a second compensated common electrode line and a third compensated common electrode line, includes:

the first voltage compensation line receiving the compensation voltage from the common voltage compensation unit and transmitting the compensation voltage to the first compensated common electrode line, the second voltage compensation line receiving the compensation voltage from the common voltage compensation unit and transmitting the compensation voltage to the third compensated common electrode line, and the third voltage compensation line receiving the compensation voltage from the common voltage compensation unit and transmitting the compensation voltage to the second compensated common electrode line.

Embodiments of the present disclosure further provide a display panel including a common electrode, a common voltage compensation device, and a plurality of common electrode lines coupled to the common electrode, the common electrode including a plurality of sub-electrodes arranged in rows and columns, the display panel including a first side and a second side opposite to each other in a column direction, the plurality of common electrode lines being arranged in the column direction and each extending in a row direction, and the common voltage compensation device including a common voltage compensation unit, a voltage feedback line, and at least one voltage compensation line, wherein the plurality of common electrode lines are sequentially numbered according to a distance from the common voltage compensation unit, a number of the plurality of common electrode lines is n, and n is an integer greater than 8, and the common voltage compensation unit is at the first side of the display panel, and is configured to provide a common voltage to the common electrode through the plurality of common electrode lines, detect an actual common voltage on one of the plurality of common electrode lines, and provide a compensation voltage to at least one of the plurality of common electrode lines, one end of the voltage feedback line is coupled to the common voltage compensation unit, and the other end of the voltage feedback line is coupled to one of an N1-th common electrode line to an N2-th common electrode line, and the voltage feedback line is configured to acquire the actual common voltage on the common electrode line coupled to the voltage feedback line and transmit the acquired actual common voltage to the common voltage compensation unit, where N1 is a value rounded down from n/8, and N2 is a value rounded down from n/4; and one end of the at least one voltage compensation line is coupled to the common voltage compensation unit, and the other end of the at least one voltage compensation line is coupled to the at least one of the plurality of common electrode lines, and the at least one voltage compensation line is configured to receive the compensation voltage from the common voltage compensation unit and transmit the compensation voltage to the common electrode through the at least one common electrode line to compensate the common voltage of the common electrode.

In some embodiments, the other end of the voltage feedback line is coupled to one of an N3-th common electrode line to the N2-th common electrode line, where N3 is a value rounded down from n/6.

In some embodiments, the other end of the voltage feedback line is coupled to an N3-th common electrode line, where N3 is a value rounded down from n/6.

In some embodiments, the at least one voltage compensation line includes at least one of a first voltage compensation line, a second voltage compensation line, and a third voltage compensation line, the first voltage compensation line is coupled to one of a first common electrode line to an N3-th common electrode line, where N3 is a value rounded down from n/6;

the second voltage compensation line is coupled to an N5-th common electrode line, where N5 is a value rounded down from n/2; and the third voltage compensation line is coupled to one of an N4-th common electrode line to a common electrode line closest to the common voltage compensation unit, where N4 is a value rounded down from 3*n/4.

Embodiments of the present disclosure further provide a display device including the above display panel.

DETAILED DESCRIPTION

In general, a source driving printed circuit board X-PCB is disposed at one side of a display panel, and a voltage feedback line for detecting a common voltage on a common electrode is disposed at a position (hereinafter, referred to as a distal end) of the common electrode distal to the source driving printed circuit board X-PCB. When compensating the common voltage on the common electrode, the common electrode is compensated for according to the common voltage detected at the distal end of the common electrode. However, since the common voltage at the distal end of the common electrode has a large delay, the common voltage at the distal end of the common electrode cannot truly reflect the common voltage inside the common electrode. Therefore, the effect of compensation using the common voltage at the distal end of the common electrode is poor.

In order to make objects, technical solutions and advantages of the present application clearer, the present application will be described in further detail with reference to the accompanying drawings. It is apparent that the described embodiments are only part of embodiments of the present application, rather than all of the embodiments of the present application. Based on the embodiments in the present application, all other embodiments obtained by those skilled in the art without creative effort shall fall within the protection scope of the present application.

Shapes and sizes of various elements in the accompanying drawings are not to scale and are merely intended to facilitate an understanding of the embodiments of the present application.

Figure 1:
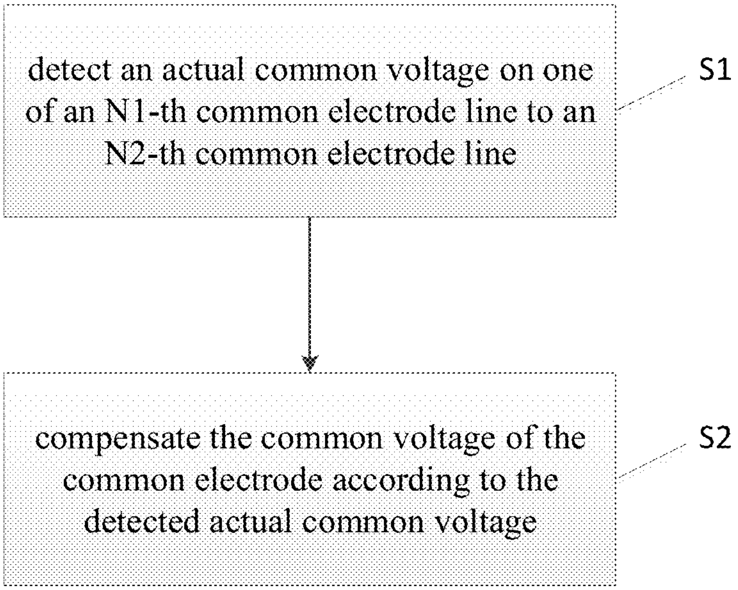
FIG. 1 is a block diagram illustrating an example of a common voltage compensation method for a display panel according to an embodiment of the present disclosure.
Figure 2:
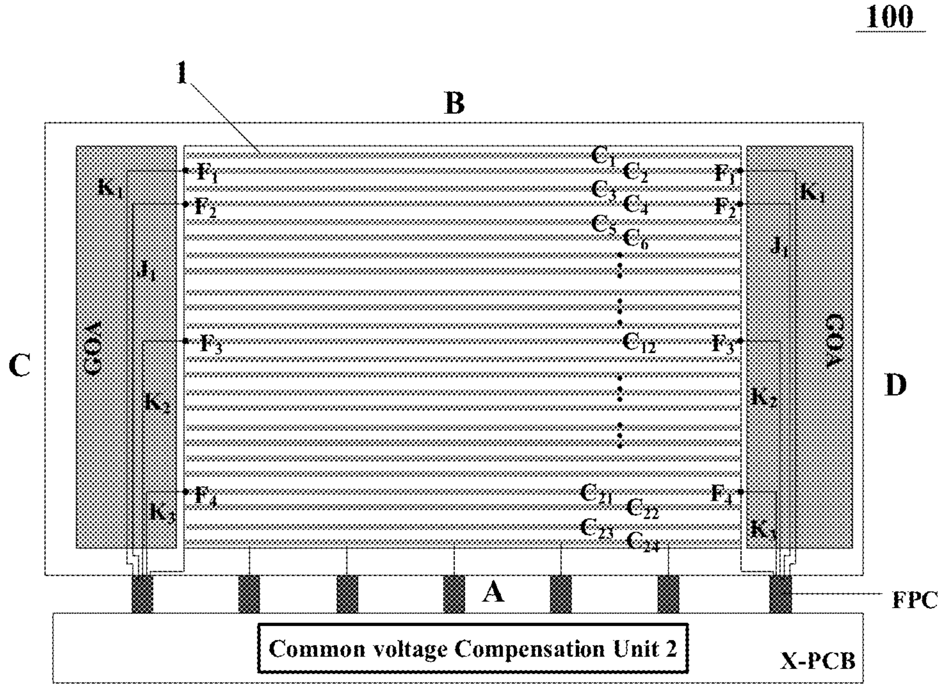
FIG. 2 is a schematic diagram illustrating an example of a display panel to which the common voltage compensation method for the display panel of FIG. 1 is applied according to an embodiment of the present disclosure.
Figure 3:
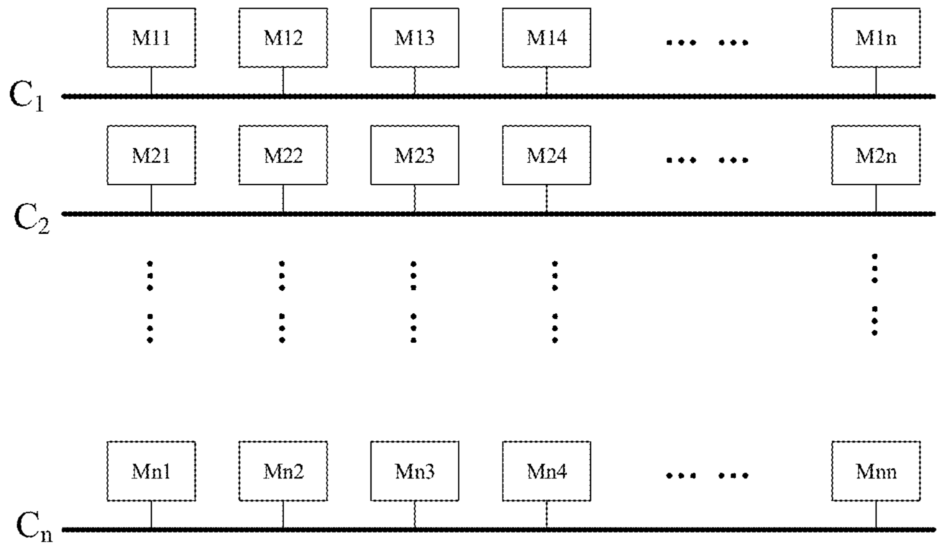
FIG. 3 is a schematic structural diagram illustrating an example of a common electrode of the display panel of FIG. 2.

FIG. 1 is a block diagram illustrating an example of a common voltage compensation method for a display panel according to an embodiment of the present disclosure. FIG. 2 is a schematic diagram illustrating an example of a display panel to which the common voltage compensation method for the display panel of FIG. 1 is applied according to an embodiment of the present disclosure. FIG. 3 is a schematic structural diagram illustrating an example of a common electrode of the display panel of FIG. 2.

As shown in FIG. 2, a display panel 100 according to an embodiment of the present disclosure may include a common electrode 1, a common voltage compensation unit 2, and a plurality of common electrode lines (for example, $C_1$ to $C_{24}$ in FIG. 2) coupled to the common electrode. The common electrode 1 may include a plurality of sub-electrodes arranged in rows and columns. As shown in FIG. 2, the display panel 100 may include a first side A and a second side B opposite to each other in a column direction.

As shown in FIG. 2, the common voltage compensation unit 2 is disposed at the first side A of the display panel 100, the common voltage compensation unit 2 is configured to provide a common voltage to the common electrode 1, the plurality of common electrode lines (for example, $C_1$ to $C_{24}$ in FIG. 2) extend in a row direction, and the plurality of common electrode lines are arranged in the column direction. The common voltage compensation unit 2 provides the common voltage to the common electrode 1 through the plurality of common electrode lines. The display panel 100 may further include a plurality of gate lines (not shown in FIG. 2) extending in the row direction and a plurality of data lines (not shown in FIG. 2) extending in the column direction. The plurality of gate lines may be in one-to-one correspondence with the plurality of common electrode lines.

In an embodiment of the present disclosure, the plurality of common electrode lines are sequentially numbered according to a distance from the common voltage compensation unit 2, the number of the plurality of common electrode lines is n, and n is an integer greater than 8. For example, in the embodiments as shown in FIGS. 2 and 3, a first common electrode line $C_1$ having a smallest number is farthest from the common voltage compensation unit 2, and an n-th common electrode line $C_n$ having a largest number is closest to the common voltage compensation unit 2.

In some embodiments, as shown in FIG. 3, the common electrode 1 may include a plurality of block-shaped sub-electrodes (for example, block-shaped sub-electrodes M11 to Mnn in FIG. 3) arranged in rows and columns, the display panel 100 includes a plurality of pixel units (not shown in FIG. 3) arranged in rows and columns, and the plurality of block-shaped sub-electrodes are in one-to-one correspondence with the plurality of pixel units. As shown in FIG. 3, each of the common electrode lines is coupled to a corresponding row of block-shaped sub-electrodes, and each of the common electrode lines provides the common voltage from the common voltage compensation unit 2 to a row of block-shaped sub-electrodes coupled to the common electrode line.

For example, in some embodiments, as shown in FIG. 3, the display panel 100 according to an embodiment of the present disclosure may include n common electrode lines $C_1$ to $C_n$, the first common electrode line $C_1$ is coupled to a corresponding first row of block-shaped sub-electrodes M11 to M1$n$, a second common electrode line $C_2$ is coupled to a corresponding second row of block-shaped sub-electrodes M21 to M2$n$, . . . , and the n-th common electrode line $C_n$ is coupled to a corresponding n-th row of block-shaped sub-electrodes Mn1 to Mnn. It should be understood that the structure of the common electrode 1 is not limited to the above example.

In some embodiments, as shown in FIG. 2, the display panel 100 may further include a Gate Driver on Array Substrate (GOA) circuit coupled to the plurality of gate lines and configured to drive the plurality of gate lines. A source driving printed circuit board X-PCB is disposed at the first side A of the display panel 100, the common voltage compensation unit 2 is disposed on the source driving printed circuit board X-PCB, and the plurality of data lines are coupled to the source driving printed circuit board X-PCB through a flexible printed circuit FPC, and the source driving printed circuit board X-PCB is configured to drive the plurality of data lines by providing voltage signals to the plurality of data lines. However, the present disclosure is not limited thereto, and for example, the display panel may also drive the plurality of gate lines using a gate driver integrated circuit (G-IC).

It should be noted that, the numbers of the common electrode lines, the gate lines, and the data lines included in the display panel are not limited, and directions in which the plurality of common electrode lines, the plurality of gate lines, and the plurality of data lines extend are not limited. Embodiments of the present disclosure are described by taking the structure of the display panel 100 in FIG. 2 as an example, that is, by taking the display panel 100 including 24 (i.e., n=24) common electrode lines $C_1$ to $C_{24}$ as an example.

It should be noted that a shape of the display panel is not limited, and the embodiments of the present disclosure are described by taking the display panel that is a rectangular panel including the first side A and the second side B opposite to each other and a third side C and a fourth side D opposite to each other as an example.

As shown in FIGS. 1 and 2, the common voltage compensation method for the display panel according to an embodiment of the present disclosure includes steps S1 and S2.

In step S1, an actual common voltage on one of an N1-th common electrode line to an N2-th common electrode line is detected, N1 is a value rounded down from n/8, and N2 is a value rounded down from n/4. As shown in FIG. 2, the N1-th common electrode line is closer to the second side B of the display panel 100 than the N2-th common electrode line. That is, in the embodiment shown in FIG. 2, numbering from the second side B to the first side A of the display panel 100 (hereinafter, the numbering is also performed in this manner), the N1-th common electrode line is a third common electrode line $C_3$, and the N2-th common electrode line is a sixth common electrode line $C_6$.

As described above, in general, the common voltage is provided to the common electrode 1 by the common voltage compensation unit 2. In this case, since coupling capacitors are formed by the common electrode and wirings in the display panel, for example, a coupling capacitor Cdc is formed by the common electrode and the data line, and/or a coupling capacitor Cgc is formed by the common electrode and the gate line, the common voltage may fluctuate due to the coupling capacitors when being transmitted to the common electrode 1 from the common voltage compensation unit 2. Therefore, it is necessary to compensate the common voltage transmitted to the common electrode 1 to keep the actual common voltage on the common electrode 1 stable. In addition, the common voltage may be attenuated in the process of being transmitted from the common voltage compensation unit 2 to the common electrode 1, and thus there is a difference between the common voltage transmitted from the common voltage compensation unit 2 and the actual common voltage received by the common electrode 1.

Compared to compensation using the actual common voltage at the distal end of the common electrode, in the common voltage compensation method for the display panel according to the embodiments of the present disclosure, the actual common voltage on one of the N1-th common electrode line to the N2-th common electrode line (for example, one of the third common electrode line $C_3$ to the sixth common electrode line $C_6$ in the embodiment shown in FIG. 2) is acquired to indicate the actual common voltage inside the common electrode 1, and the acquired common voltage can more accurately reflect the actual common voltage inside the common electrode 1. Therefore, compensating for the common electrode 1 using the method according to the embodiments of the present disclosure can improve the accuracy of the compensation. Therefore, the fluctuation of the common voltage of the common electrode 1 can be effectively reduced, and the display effect of the display panel can be improved.

In some embodiments, detecting an actual common voltage on one of an N1-th common electrode line to an N2-th common electrode line may include: detecting an actual common voltage on one of an N3-th common electrode line to the N2-th common electrode line, where N3 is a value rounded down from n/6. For example, as shown in FIG. 2, by taking the display panel 100 as an example, an actual common voltage on one of a fourth common electrode line $C_4$ to the sixth common electrode line $C_6$ is acquired as the common voltage of the common electrode 1. Since the actual common voltage on any one of the fourth common electrode line $C_4$ to the sixth common electrode line $C_6$ is acquired as the common voltage of the common electrode 1, the actual common voltage inside the common electrode 1 can be reflected more accurately. Therefore, compensating for the common electrode 1 using the method according to the present embodiment can improve the accuracy of the compensation. Therefore, the fluctuation of the common voltage of the common electrode 1 can be effectively reduced, and the display effect of the display panel can be improved.

In some embodiments, detecting an actual common voltage on one of an N1-th common electrode line to an N2-th common electrode line may include: detecting the actual common voltage on the N3-th common electrode line. For example, as shown in FIG. 2, by taking the display panel 100 as an example, an actual common voltage on the fourth common electrode line $C_4$ is detected as the common voltage of the common electrode 1. Since the actual common voltage on the fourth common electrode line $C_4$ is acquired as the common voltage of the common electrode 1, the actual common voltage inside the common electrode 1 can be reflected more accurately. Therefore, compensating for the common electrode 1 using the method according to the present embodiment can further improve the accuracy of the compensation. Therefore, the fluctuation of the common voltage of the common electrode 1 can be effectively reduced, and the display effect of the display panel can be improved.

In some embodiments, a voltage feedback line may be coupled at a position of the common electrode 1 for detecting the common voltage. One end of the voltage feedback line is coupled to the common voltage compensation unit 2, and the other end of the voltage feedback line is coupled to a common electrode line on which an actual common voltage is to be detected. That is, the voltage feedback line acquires the actual common voltage on the common electrode line coupled to the voltage feedback line, and transmits the acquired actual common voltage to the common voltage compensation unit 2, and thus the common voltage compensation unit 2 detects the actual common voltage on the common electrode line. For example, as shown in FIG. 2, a voltage feedback line Ji is coupled to the fourth common electrode line $C_4$ (i.e., the N3-th common electrode line) of the display panel 100. The voltage feedback lines Ji may be symmetrically disposed at both sides of the common electrode 1 (i.e., the third side C and the fourth side D of the display panel). That is, the voltage feedback lines $J_1$ may be coupled to the fourth common electrode line $C_4$ via positions corresponding to the fourth common electrode line $C_4$ (i.e., detection points F2) at the both sides of the common electrode 1, acquire the actual common voltage on the fourth common electrode line $C_4$ as the common voltage of the common electrode 1, and transmit the acquired actual common voltage to the common voltage compensation unit 2.

It should be noted that, in the embodiments of the present disclosure, when n/8, n/6, n/4, n/2, or 3*n/4 is an integer, a value rounded down from n/8, n/6, n/4, n/2, or 3×n/4 is n/8, n/6, n/4, n/2, or 3*n/4 itself.

In step S2, the common voltage of the common electrode 1 is compensated according to the detected actual common voltage.

In some embodiments, upon receiving the common voltage of the common electrode 1 transmitted from the voltage feedback line, the common voltage compensation unit 2 determines a compensation voltage for the common electrode 1 according to a preset algorithm, and transmits the compensation voltage to the common electrode 1 to compensate the common voltage of the common electrode 1. Therefore, the stability of the common voltage of the common electrode 1 can be maintained.

In some embodiments, the common voltage compensation unit 2 may transmit the compensation voltage to the common electrode 1 by transmitting the compensation voltage to at least one common electrode line, to compensate the common voltage of the common electrode 1. For example, the common voltage compensation unit 2 may transmit the compensation voltage to at least one of first, second, and third compensated common electrode lines to compensate the common voltage of the common electrode 1.

In some embodiments, the first compensated common electrode line may be a common electrode line far away from the common voltage compensation unit 2. For example, the first compensated common electrode line may be a common electrode line from the first common electrode line to the N3-th common electrode line. For example, as shown in FIG. 2, by taking the display panel 100 as an example, the first compensated common electrode line is a common electrode line from the first common electrode line $C_1$ to the fourth common electrode line $C_4$. Following exemplary embodiments will be described by taking the first compensated common electrode line being the second common electrode line $C_2$ as an example.

In some embodiments, the second compensated common electrode line may be a common electrode line close to the common voltage compensation unit 2. For example, the second compensated common electrode line may be a common electrode line from an N4-th common electrode line to a common electrode line closest to the common voltage compensation unit 2 (i.e., the common electrode line having the largest number), and N4 is a value rounded down from 3*n/4. For example, as shown in FIG. 2, by taking the display panel 100 as an example, the second compensated common electrode line is a common electrode line from an eighteenth common electrode line $C_{18}$ to a twenty-fourth common electrode line $C_{24}$. Following exemplary embodiments will be described by taking the second compensated common electrode line being a twenty-first common electrode line $C_{21}$ as an example.

In some embodiments, the third compensated common electrode line may be an N5-th common electrode line, and N5 is a value rounded down from n/2. For example, as shown in FIG. 2, by taking the display panel 100 as an example, the third compensated common electrode line is a twelfth common electrode line $C_{12}$.

In some embodiments, as shown in FIG. 2, at least one voltage compensation line (for example, $K_1$, $K_2$, and $K_3$) may be disposed in the display panel 100. One end of the voltage compensation line is coupled to a common electrode line that will receive the compensation voltage, and the other end of the voltage compensation line is coupled to the common voltage compensation unit 2. The common voltage compensation unit 2 transmits the compensation voltage to a common electrode line for compensating the common voltage of the common electrode 1 through the voltage compensation line. For example, as shown in FIG. 2, the at least one voltage compensation line may include a first voltage compensation line $K_1$, a second voltage compensation line $K_2$, and a third voltage compensation line $K_3$.

The first voltage compensation lines $K_1$ may be symmetrically disposed at the both sides of the common electrode 1, be coupled to the first compensated common electrode line via first compensation points $F_1$, and transmit the compensation voltage to the common electrode 1 through the first compensated common electrode line.

The second voltage compensation lines $K_2$ may be symmetrically disposed at the both sides of the common electrode 1, be coupled to the third compensated common electrode line via second compensation points $F_3$, and transmit the compensation voltage to the common electrode 1 through the third compensated common electrode line.

The third voltage compensation lines $K_3$ may be symmetrically disposed at the both sides of the common electrode 1, be coupled to the second compensated common electrode line through third compensation points $F_4$, and transmit the compensation voltage to the common electrode 1 through the second compensated common electrode line.

In summary, in step S2, the compensation voltage may be transmitted to at least one of the first, second, and third compensated common electrode lines. In some embodiments, the first voltage compensation line, the second voltage compensation line, and the third voltage compensation line may be coupled to the first compensated common electrode line, the second compensated common electrode line, and the third compensated common electrode line, respectively, and the common voltage of the common electrode 1 is compensated through the first, second, and third compensated common electrode lines. As shown in FIG. 2, since the first, second, and third compensated common electrode lines are coupled to the sub-electrodes in different regions of the common electrode 1, the accuracy of the compensation can be improved.

In some embodiments, the common voltage compensation unit 2 may calculate the compensation voltage for the common electrode 1 according to various algorithms upon receiving the common voltage of the common electrode 1 transmitted from the voltage feedback line. For example, a reference common voltage for the common electrode 1 may be preset in the common voltage compensation unit 2, and then the compensation voltage for the common electrode 1 may be calculated according to a deviation value between the detected common voltage of the common electrode 1 and the preset reference common voltage. For example, the compensation voltage for the common electrode may be calculated according to a preset proportional relationship between the deviation value and the compensation voltage.

Figure 4:
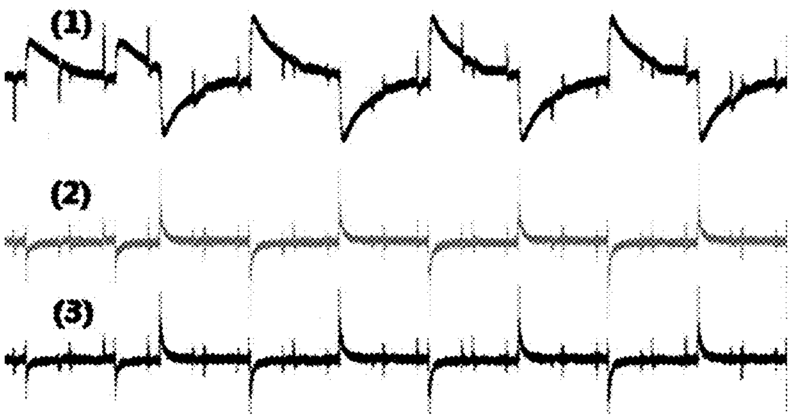
FIG. 4 illustrates a detected actual common voltage and a compensated common voltage of a common electrode 1 in a case that a common voltage compensation method for a display panel according to an embodiment of the present disclosure is applied.

FIG. 4 illustrates a detected actual common voltage and a compensated common voltage of a common electrode 1 in a case that a common voltage compensation method for a display panel according to an embodiment of the present disclosure is applied.

As shown in FIG. 4, waveform (1) is a waveform of the actual common voltage on the N3-th common electrode line (i.e., the fourth common electrode line $C_4$ in FIG. 2) when the common voltage of the common electrode 1 is not compensated. It can be seen that waveform (1) has a large jitter. Waveform (2) is a waveform of the common voltage on the N3-th common electrode line (i.e., the fourth common electrode line $C_4$ in FIG. 2) after the common voltage of the common electrode 1 is compensated through the third compensated common electrode line. It can be seen that waveform (2) is more stable than waveform (1). Waveform (3) is a waveform of the common voltage on the N3-th common electrode line (i.e., the fourth common electrode line $C_4$ in FIG. 2) after the common voltage of the common electrode 1 is compensated through the second compensated common electrode line. It can be seen that waveform (3) is more stable than waveform (1).

As shown in FIG. 2, an embodiment of the present disclosure also provides a common voltage compensation device for a display panel. The display panel 100 includes the first side A and the second side B opposite to each other in the column direction, and the display panel 100 further includes the common electrode 1, the common voltage compensation device including the common voltage compensation unit 2, and the plurality of common electrode lines (for example, $C_1$ to $C_{24}$ in FIG. 2). The common voltage compensation unit 2 is disposed at the first side A of the display panel 100, the common voltage compensation unit 2 is configured to provide the common voltage to the common electrode 1, and the plurality of common electrode lines are arranged in the column direction.

The common voltage compensation device according to an embodiment of the present disclosure may further include the voltage feedback line and at least one voltage compensation line.

One end of the voltage feedback line (for example, $J_1$ in FIG. 2) is coupled to the common voltage compensation unit 2, and the other end of the voltage feedback line is coupled to one of the N1-th common electrode line (for example, $C_3$ in FIG. 2) to the N2-th common electrode line (for example, $C_6$ in FIG. 2). The voltage feedback line is configured to transmit the actual common voltage on a common electrode line coupled to the voltage feedback line to the common voltage compensation unit 2, thereby enabling the common voltage compensation unit 2 to detect the actual common voltage on the common electrode line.

One end of the voltage compensation line (for example, $K_1$ to $K_3$ in FIG. 2) is coupled to the common voltage compensation unit 2, and the other end of the voltage compensation line is coupled to the common electrode 1. The voltage compensation line is configured to transmit the compensation voltage obtained based on the detected actual common voltage by the common voltage compensation unit 2 to the common electrode 1 to compensate the common voltage of the common electrode 1. The voltage compensation line may be fixedly or detachably coupled to the common electrode 1.

In some embodiments, the common voltage compensation unit 2 may be implemented by hardware such as an integrated circuit, a field programmable gate array, or the like.

In some embodiments, the common voltage compensation unit 2 may be implemented to include a processor such as a central processing unit and a memory storing instructions, and the instructions, when executed by the processor, cause the common voltage compensation unit 2 to perform the common voltage compensation method for the display panel according to the embodiments of the present disclosure.

In some embodiments, the voltage feedback line and the voltage compensation line may include metal such as gold, silver, and the like.

In some embodiments, the voltage feedback line may be coupled to one of the N3-th common electrode line (for example, $C_4$ in FIG. 2) to the N2-th common electrode line (for example, $C_6$ in FIG. 2), and transmit the detected actual common voltage on the common electrode line to the common voltage compensation unit 2.

In some embodiments, the voltage feedback line may be coupled to the N3-th common electrode line, and transmit the detected actual common voltage on the N3-th common electrode line to the common voltage compensation unit 2. For example, as shown in FIG. 2, the voltage feedback line $J_1$ is coupled to the fourth common electrode line $C_4$ and transmits the actual common voltage on the fourth common electrode line $C_4$ to the common voltage compensation unit 2.

In some embodiments, the voltage compensation line may include at least one of the first voltage compensation line $K_1$, the second voltage compensation line $K_2$, and the third voltage compensation line $K_3$. The first voltage compensation line $K_1$ is coupled to one (for example, the second common electrode line $C_2$ in FIG. 2) of the first common electrode line to the N3-th common electrode line, the second voltage compensation line $K_2$ is coupled to the N5-th common electrode line (for example, the twelfth common electrode line $C_{12}$ in FIG. 2), and the third voltage compensation line $K_3$ is coupled to one (for example, the twenty-first common electrode line $C_{21}$ in FIG. 2) of the N4-th common electrode line to the common electrode line having the largest number.

In addition, as shown in FIG. 2, an embodiment of the present disclosure also provides a display panel including the above common voltage compensation device.

In addition, an embodiment of the present disclosure also provides a display device including the above display panel. The display device may include any product or component with a display function, such as a mobile phone, a tablet computer, a television, a display, a notebook computer, a digital photo frame, a navigator, and the like.

It will be appreciated that the above embodiments are merely exemplary embodiments for the purpose of illustrating the principle of the disclosure, and the disclosure is not limited thereto. Various modifications and improvements can be made by a person having ordinary skill in the art without departing from the spirit and essence of the disclosure. Accordingly, all of the modifications and improvements also fall into the protection scope of the disclosure.

What is claimed is:

1. A common voltage compensation method for a display panel, the display panel comprising a common electrode, a common voltage compensation unit, and a plurality of common electrode lines coupled to the common electrode, the common electrode comprising a plurality of sub-electrodes arranged in rows and columns, and the plurality of common electrode lines being arranged in a column direction and each extending in a row direction, wherein the plurality of common electrode lines are a first common electrode line to an n-th common electrode line sequentially arranged in the column direction, where n is an integer greater than 8, the common voltage compensation unit is at one side of the display panel, such that from k=2 to k=n, a k-th common electrode line among the first common electrode line to the n-th common electrode line is closer to the common voltage compensation unit than a (k−1)-th common electrode line among the first common electrode line to the n-th common electrode line, where n≥k≥2 and k is an integer, and the method comprises:

the common voltage compensation unit providing a common voltage to the common electrode through the plurality of common electrode lines;

the common voltage compensation unit detecting an actual common voltage on only one common electrode line of an N1-th common electrode line to an N2-th common electrode lines of the plurality of common electrode lines, where N1 is a value rounded down from n/8, and N2 is a value rounded down from n/4; and the common voltage compensation unit providing, according to the detected actual common voltage, a compensation voltage to the common electrode through at least one of the plurality of common electrode lines to compensate the common voltage of the common electrode.

2. The method of claim 1, wherein the detecting of the actual common voltage on only the one common electrode line of the N1-th common electrode line to the N2-th common electrode line of the plurality of common electrode lines, comprises:

detecting an actual common voltage on only one common electrode line of an N3-th common electrode line to the N2-th common electrode lines of the plurality of common electrode lines, where N3 is a value rounded down from n/6.

3. The method of claim 1, wherein the detecting of the actual common voltage on only the one common electrode line of the N1-th common electrode line to the N2-th common electrode line of the plurality of common electrode lines, comprises:

detecting an actual common voltage on only an N3-th common electrode line of the plurality of common electrode lines, where N3 is a value rounded down from n/6.

4. The method of claim 1, wherein the display panel further comprises a voltage feedback line, one end of the voltage feedback line is coupled to the common voltage compensation unit, and another end of the voltage feedback line is coupled to only the one common electrode line on which the actual common voltage is to be detected, and the common voltage compensation unit detecting the actual common voltage on only the one common electrode line of the N1-th common electrode line to the N2-th common electrode line of the plurality of common electrode lines comprises: the voltage feedback line acquiring the actual common voltage on only the one common electrode line coupled to the voltage feedback line and transmitting the acquired actual common voltage to the common voltage compensation unit.

5. The method of claim 1, wherein the common voltage compensation unit detecting the actual common voltage on only the one common electrode line of the N1-th common electrode line to the N2-th common electrode line of the plurality of common electrode lines comprises: the common voltage compensation unit selecting only the one common electrode line from the N1-th common electrode line to the N2-th common electrode lines and detecting the actual common voltage on only the one common electrode line.

6. A common voltage compensation method for a display panel, the display panel comprising a common electrode, a common voltage compensation unit, and a plurality of common electrode lines coupled to the common electrode, the common electrode comprising a plurality of sub-electrodes arranged in rows and columns, and the plurality of common electrode lines being arranged in a column direction and each extending in a row direction, wherein the plurality of common electrode lines are a first common electrode line to an n-th common electrode line sequentially arranged in the column direction, where n is an integer greater than 8, the common voltage compensation unit is at one side of the display panel, such that from k=2 to k=n, a k-th common electrode line among the first common electrode line to the n-th common electrode line is closer to the common voltage compensation unit than a (k−1)-th common electrode line among the first common electrode line to the n-th common electrode line, where n≥k≥2 and k is an integer, and the method comprises:

the common voltage compensation unit providing a common voltage to the common electrode through the plurality of common electrode lines;

the common voltage compensation unit detecting an actual common voltage on only one common electrode line of an N1-th common electrode line to an N2-th common electrode line of the plurality of common electrode lines, where N1 is a value rounded down from n/8, and N2 is a value rounded down from n/4; and the common voltage compensation unit obtaining the compensation voltage according to the detected actual common voltage and transmitting the compensation voltage to at least one of a first compensated common electrode line, a second compensated common electrode line, and a third compensated common electrode line, and the at least one of the first compensated common electrode line, the second compensated common electrode line, and the third compensated common electrode line transmitting the compensation voltage to the common electrode, the first compensated common electrode line is a common electrode line from a first common electrode line to an N3-th common electrode line, where N3 is a value rounded down from n/6, the second compensated common electrode line is a common electrode line from an N4-th common electrode line to a common electrode line closest to the common voltage compensation unit, where N4 is a value rounded down from 3*n/4, and the third compensated common electrode line is an N5-th common electrode line, where N5 is a value rounded down from n/2.

7. The method of claim 6, wherein the display panel further comprises a first voltage compensation line, a second voltage compensation line, and a third voltage compensation line, one end of the first voltage compensation line is coupled to the first compensated common electrode line, and another end of the first voltage compensation line is coupled to the common voltage compensation unit, one end of the second voltage compensation line is coupled to the third compensated common electrode line, and another end of the second voltage compensation line is coupled to the common voltage compensation unit, one end of the third voltage compensation line is coupled to the second compensated common electrode line, and another end of the third voltage compensation line is coupled to the common voltage compensation unit, and the common voltage compensation unit transmitting the compensation voltage to at least one of the first compensated common electrode line, the second compensated common electrode line and the third compensated common electrode line, comprises:

the first voltage compensation line receiving the compensation voltage from the common voltage compensation unit and transmitting the compensation voltage to the first compensated common electrode line, the second voltage compensation line receiving the compensation voltage from the common voltage compensation unit and transmitting the compensation voltage to the third compensated common electrode line, and the third voltage compensation line receiving the compensation voltage from the common voltage compensation unit and transmitting the compensation voltage to the second compensated common electrode line.

8. A display panel comprising a common electrode, a common voltage compensation device, and a plurality of common electrode lines coupled to the common electrode, the common electrode comprising a plurality of sub-electrodes arranged in rows and columns, the plurality of common electrode lines being arranged in a column direction and each extending in a row direction, and the common voltage compensation device comprising a common voltage compensation unit, a voltage feedback line, and at least one voltage compensation line, wherein the plurality of common electrode lines are a first common electrode line to an n-th common electrode line sequentially arranged in the column direction, where n is an integer greater than 8, the common voltage compensation unit is at one side of the display panel, such that from k=2 to k=n, a k-th common electrode line among the first common electrode line to the n-th common electrode line is closer to the common voltage compensation unit than a (k−1)-th common electrode line among the first common electrode line to the n-th common electrode line, where n≥k≥2 and k is an integer, the common voltage compensation unit is configured to provide a common voltage to the common electrode through the plurality of common electrode lines, detect an actual common voltage on only one common electrode line of an N1-th common electrode line to an N2-th common electrode line of the plurality of common electrode lines, and provide a compensation voltage to at least one of the plurality of common electrode lines, where N1 is a value rounded down from n/8, and N2 is a value rounded down from n/4, one end of the voltage feedback line is coupled to the common voltage compensation unit, and another end of the voltage feedback line is coupled to only the one common electrode line, and the voltage feedback line is configured to acquire the actual common voltage on only the one common electrode line coupled to the voltage feedback line and transmit the acquired actual common voltage to the common voltage compensation unit as the detected actual common voltage, one end of the at least one voltage compensation line is coupled to the common voltage compensation unit, and another end of the at least one voltage compensation line is coupled to the at least one of the plurality of common electrode lines, and the at least one voltage compensation line is configured to receive the compensation voltage from the common voltage compensation unit and transmit the compensation voltage to the common electrode through the at least one common electrode line to compensate the common voltage of the common electrode.

9. The display panel of claim 8, wherein the another end of the voltage feedback line is coupled to only one common electrode line of an N3-th common electrode line of the plurality of common electrode lines to the N2-th common electrode line, where N3 is a value rounded down from n/6.

10. The display panel of claim 8, wherein the another end of the voltage feedback line is coupled to only an N3-th common electrode line of the plurality of common electrode lines, where N3 is a value rounded down from n/6.

11. A display device, comprising the display panel of claim 8.

12. A display panel comprising a common electrode, a common voltage compensation device, and a plurality of common electrode lines coupled to the common electrode, the common electrode comprising a plurality of sub-electrodes arranged in rows and columns, the plurality of common electrode lines being arranged in a column direction and each extending in a row direction, and the common voltage compensation device comprising a common voltage compensation unit, a voltage feedback line, and at least one voltage compensation line, wherein the plurality of common electrode lines are a first common electrode line to an n-th common electrode line sequentially arranged in the column direction, where n is an integer greater than 8, the common voltage compensation unit is at one side of the display panel, such that from k=2 to k=n, a k-th common electrode line among the first common electrode line to the n-th common electrode line is closer to the common voltage compensation unit than a (k−1)-th common electrode line among the first common electrode line to the n-th common electrode line, where n≥k≥2 and k is an integer, the common voltage compensation unit is configured to provide a common voltage to the common electrode through the plurality of common electrode lines, detect an actual common voltage on only one common electrode line of an N1-th common electrode line to an N2-th common electrode line of the plurality of common electrode lines, and provide a compensation voltage to at least one of the plurality of common electrode lines, where N1 is a value rounded down from n/8, and N2 is a value rounded down from n/4, one end of the voltage feedback line is coupled to the common voltage compensation unit, and another end of the voltage feedback line is coupled to only the one common electrode line, and the voltage feedback line is configured to acquire the actual common voltage on only the one common electrode line coupled to the voltage feedback line and transmit the acquired actual common voltage to the common voltage compensation unit as the detected actual common voltage, one end of the at least one voltage compensation line is coupled to the common voltage compensation unit, and another end of the at least one voltage compensation line is coupled to the at least one of the plurality of common electrode lines, and the at least one voltage compensation line is configured to receive the compensation voltage from the common voltage compensation unit and transmit the compensation voltage to the common electrode through the at least one common electrode line to compensate the common voltage of the common electrode, the at least one voltage compensation line comprises at least one of a first voltage compensation line, a second voltage compensation line, and a third voltage compensation line, the first voltage compensation line is coupled to one of a first common electrode line to an N3-th common electrode line, where N3 is a value rounded down from n/6;

the second voltage compensation line is coupled to an N5-th common electrode line, where N5 is a value rounded down from n/2; and the third voltage compensation line is coupled to one of an N4-th common electrode line to a common electrode line closest to the common voltage compensation unit, where N4 is a value rounded down from 3*n/4.

* * * * *